(12) United States Patent
Li

(10) Patent No.: US 9,957,178 B2
(45) Date of Patent: May 1, 2018

(54) BDP SEWAGE DENITROGENATION TREATMENT SYSTEM AND METHOD FOR SEWAGE DENITROGENATION TREATMENT

(71) Applicant: BDP Enviro Tech Limited, Beijing (CN)

(72) Inventor: Jianguo Li, Beijing (CN)

(73) Assignee: BDP Enviro Tech Limited, Beijing (CN)

(*) Notice: Subject to any disclaimer, the term of this patent is extended or adjusted under 35 U.S.C. 154(b) by 0 days. days.

(21) Appl. No.: 14/401,460

(22) PCT Filed: Jun. 20, 2014

(86) PCT No.: PCT/CN2014/080375
§ 371 (c)(1),
(2) Date: Nov. 14, 2014

(87) PCT Pub. No.: WO2015/192367
PCT Pub. Date: Dec. 23, 2015

(65) Prior Publication Data
US 2017/0096354 A1    Apr. 6, 2017

(51) Int. Cl.
*C02F 3/12* (2006.01)
*C02F 3/22* (2006.01)
*C02F 1/00* (2006.01)
*B01D 21/00* (2006.01)
*C02F 101/16* (2006.01)

(52) U.S. Cl.
CPC ........ *C02F 3/1205* (2013.01); *B01D 21/0042* (2013.01); *B01D 21/0051* (2013.01); *C02F 1/00* (2013.01); *C02F 3/223* (2013.01); *C02F 2001/007* (2013.01); *C02F 2101/16* (2013.01); *C02F 2101/166* (2013.01); *C02F 2301/046* (2013.01)

(58) Field of Classification Search
None
See application file for complete search history.

(56) References Cited

U.S. PATENT DOCUMENTS

| 4,857,185 A | 8/1989 | Desjardins |
| 5,961,826 A | 10/1999 | Kim |
| 2007/0102356 A1* | 5/2007 | Bailey, Jr. ............... C02F 3/121 210/624 |

FOREIGN PATENT DOCUMENTS

| CN | 101602541 A | 12/2009 |
| CN | 201729739 U | 2/2011 |
| CN | 201883002 U | 6/2011 |
| CN | 102180543 A | 9/2011 |
| CN | 102795745 A | 11/2012 |
| CN | 203079741 U | 7/2013 |

(Continued)

OTHER PUBLICATIONS

Merriam-Webster Dictionary, definition of "New York minute," www.learnersdictionary.com, downloaded Dec. 1, 2017 (2017).*

(Continued)

*Primary Examiner* — Chester T Barry
(74) *Attorney, Agent, or Firm* — Saul Ewing Arnstein & Lehr LLP; Peter C. Lauro, Esq.

(57) ABSTRACT

The present invention provides Biological Double efficiency Product (BDP) sewage denitrogenation treatment systems and methods.

11 Claims, 2 Drawing Sheets

(56) References Cited

FOREIGN PATENT DOCUMENTS

| CN | 203382563 U | 1/2014 |
|---|---|---|
| GB | 3544-2008 | 1/2008 |
| GB | 21904-2008 | 1/2008 |
| JP | 2006055739 A | 3/2006 |
| JP | 2008086991 A | 4/2008 |

OTHER PUBLICATIONS

Office Action issued in Chinese Patent Application No. 20140279739.0 dated Sep. 17, 2015.
Chinese Environmental Protection Agency Industry Advisory GB3544-2008: Discharge Standard to Water Pollutants for Pulp and Paper Industry (Jun. 25, 2008).
Chinese Environmental Protection Agency Industry Advisory GB21904-2008: Discharge Standard to Water Pollutants for Pharmaceutical Industry Chemical Synthesis Products Category (Jun. 25, 2008).
"Emerging Technologies for Wastewater Treatment and in-Plant Wet Weather Management", Office of Wastewater Management, U.S. Environmental Protection Agency, Washington, D.C., EPA 832-R-12-011 Addendum, pp. 1-17, (2013).

* cited by examiner

BDP SEWAGE DENITROGENATION TREATMENT SYSTEM AND METHOD FOR SEWAGE DENITROGENATION TREATMENT

This application is the U.S. national phase of International application No. PCT/CN2014/080375, filed Jun. 20, 2014, the disclosure of which is incorporated herein in its entirety by reference.

FIELD OF THE INVENTION

The present invention relates to the field of sewage treatment technology, and particularly relates to a BDP (Biological Double efficiency Process) sewage denitrogenation treatment system and a method for sewage denitrogenation treatment.

BACKGROUND OF THE INVENTION

Total nitrogen (abbreviated as TN) refers to the total amount of inorganic and organic nitrogen in various forms in water, including inorganic nitrogen such as $NO_3^-$, $NO_2^-$ and $NH_4^+$, as well as organic nitrogen such as proteins, amino acids and organic amines, and is calculated as milligrams of nitrogen per liter of water. It is often used to indicate the degree to which the water body is contaminated by nutrient substances. When the nitrogen and phosphorus containing substances in the surface water are excessive, microorganism blooms, plankton grows vigorously, and thus eutrophication status occurs.

With regard to the discharge of industrial effluents, different standards for different industries have also been set in our country. For one example, it is stipulated in GB3544-2008 (Discharge standard of water pollutants for pulp and paper industry) that, the discharge limit of total nitrogen for pulping enterprises is 18 mg/L, the discharge limit of total nitrogen for waste paper pulping and papermaking enterprises is 15 mg/L, the discharge limit of total nitrogen for other pulping and papermaking enterprises is 15 mg/L, and the discharge limit of total nitrogen for papermaking enterprises is 15 mg/L. For another example, it is stipulated in GB 21904-2008 (Discharge standard of water pollutants for pharmaceutical industry, Chemical synthesis products category) that, the discharge limit of total nitrogen for existing enterprises is 50 (40) mg/L, and the discharge limit of total nitrogen for new enterprises is 35 (20) mg/L.

Current methods for effluent denitrogenation at home and abroad can be classified as physic-chemical methods and biological denitrogenation methods, wherein the physic-chemical methods include air stripping method, breakpoint chlorination method, zeolite adsorption method and flocculation sedimentation method. Both the air stripping method and the flocculation sedimentation method can be used for pretreatment of high-ammonia nitrogen effluent, but the latter is higher in operation costs. Both the breakpoint chlorination method and the zeolite adsorption method are suitable for advanced treatment, however, the former requires liquid chlorine which is too expensive and difficult to preserve, but it can compensate for the maladaptation of the stripping method to the cold season, and the treatment of the regenerated liquid remains a problem for the latter. Biological denitrogenation methods include the traditional process of denitrogenation based on three reactions of ammonification, nitrification, denitrification, A/O (anoxic/aerobic) denitrogenation process, oxidation ditch nitrification denitrogenation method and SBR (intermittent aeration activated sludge method). Biological methods for denitrogenation are in various forms, and have great potential due to their characteristics such as economy and absence of secondary pollution.

However, the above methods disclosed in the prior art cannot sufficiently utilize the carbon source in the original water to achieve the discharge requirements for denitrogenation treatment, and thereby require addition of more carbon source. With the development of economy and the increasing attention paid to the environment protection by countries, the discharge standard for total nitrogen is continuously increasing. For example, the US will implement a discharge standard of TN 5 mg/l from 2020, and the current treatment technologies cannot achieve the requirement of this discharge standard.

SUMMARY OF THE INVENTION

In view of the above, the subject of the present invention is to provide a BDP sewage denitrogenation treatment system and method, and the content of total nitrogen in the discharged water after treatment by the sewage denitrogenation treatment system provided by the present invention meets the discharge control standard.

The present invention provides a BDP sewage denitrogenation treatment system, comprising a water inlet zone which is provided with a water inlet;

a first aerodynamic zone in communication with the water inlet zone;

a circumfluent zone in communication with the first aerodynamic zone;

a second aerodynamic zone in communication with the circumfluent zone;

a rapid sedimentation zone which is in communication with the second aerodynamic zone and provided with a water outlet; and a reflux buffering zone in communication with the rapid sedimentation zone and the circumfluent zone; and on the wall of the circumfluent zone there is provided a sludge exchange pipe via which the circumfluent zone exchanges sludge with a BDP tank.

Preferably, three adjacent side walls of the sedimentation zone share walls with the circumfluent zone, the reflux buffering zone and the second aerodynamic zone.

Preferably, the circumfluent zone is an annular groove body, a square groove body, a rectangular groove body, a circular groove body or an elliptical groove body.

Preferably, the bottom of the rapid sedimentation zone is provided with a steady flow plate.

A gas flushing device, an inclined plate settler and an inclined tube settler are provided on the steady flow plate.

The gas flushing device is disposed spaced from the inclined plate settler.

The inclined tube settler is disposed on the inclined plate settler.

Preferably, the circumfluent zone is provided with an air blower.

The air blower stirs the sewage within the circumfluent zone via gas-pumping.

Preferably, the water inlet zone and the first aerodynamic zone are provided within the circumfluent zone.

Preferably, within the circumfluent zone there is provided a division wall along the longitudinal direction.

The water inlet zone and the first aerodynamic zone are provided between the division wall and the outer wall of the circumfluent zone.

The present invention provides a sewage denitrogenation treatment method, comprising the following steps:

the sewage to be treated is introduced into a sewage denitrogenation treatment system via a water inlet zone;

then sequentially treated through a first aerodynamic zone, a circumfluent zone, a second aerodynamic zone and a rapid sedimentation zone, and the treated sewage is discharged via the rapid sedimentation zone;

the sludge in the rapid sedimentation zone flows back to the circumfluent zone via a reflux buffering zone;

the circumfluent zone exchanges sludge with a BDP tank via a sludge exchange pipe.

Preferably, the particle size of the bacterial micelle in the sewage denitrogenation treatment system is 100 μm or less.

Preferably, the dissolved oxygen in the sewage denitrogenation treatment system discretely fluctuates within the range of 0.1 mg/L~0.3 mg/L.

Preferably, the lateral flow rate of the water body in the sewage denitrogenation treatment system is 0.05 m/s~0.2 m/s.

The present invention provides a BDP sewage denitrogenation treatment system, comprising a water inlet zone which is provided with a water inlet; a first aerodynamic zone in communication with the water inlet zone; a circumfluent zone in communication with the first aerodynamic zone; a second aerodynamic zone in communication with the circumfluent zone; a rapid sedimentation zone in communication with the second aerodynamic zone, which rapid sedimentation zone is provided with a water outlet; a reflux buffering zone in communication with the rapid sedimentation zone, which reflux buffering zone is in communication with the circumfluent zone; on the circumfluent zone wall there is provided a sludge exchange pipe, the circumfluent zone exchanges a part of sludge with the BDP tank through the sludge exchange pipe. The sewage to be treated is introduced into the BDP sewage denitrogenation treatment system provided in the present application through the water inlet zone, which then sequentially flows through the first aerodynamic zone, the circumfluent zone, the second aerodynamic zone and the rapid sedimentation zone, and finally discharges via the rapid sedimentation zone; the sludge in the rapid sedimentation zone flows back to the circumfluent zone via the reflux buffering zone, and the circumfluent zone exchanges sludge with the BDP tank via the sludge exchange pipe. The BDP sewage denitrogenation treatment system provided in the present invention performs sludge exchange with the BDP tank via the circumfluent zone, and performs denitrogenation by maximally utilizing the organics in the water; and air is introduced into the water body, which is capable of partially oxidizing the ammonia nitrogen in the sewage into nitrite, and allows the nitrite to oxidize the ammonia nitrogen in the sewage, reduces the required quantity of the carbon source for denitrification, thereby increasing the water outlet index of the discharged water, which is capable of meeting the upcoming discharge control standard for total nitrogen. The experimental results indicate that the total nitrogen index of the sewage after treatment by employing the BDP sewage denitrogenation treatment system provided in the present application is lower than 5 mg/L.

In addition, the technological process of denitrogenation treatment of the sewage performed by employing the system provided in the present invention is simple, and the TN in the discharged water can stably achieve the discharge standard.

EMBODIMENTS

The present invention provides a BDP sewage denitrogenation treatment system, comprising a water inlet zone which is provided with a water inlet;

a first aerodynamic zone in communication with the water inlet zone;

a circumfluent zone in communication with the first aerodynamic zone;

a second aerodynamic zone in communication with the circumfluent zone;

a rapid sedimentation zone which is in communication with the second aerodynamic zone and provided with a water outlet; and a reflux buffering zone in communication with the rapid sedimentation zone and the circumfluent zone; and on the wall of the circumfluent zone there is provided a sludge exchange pipe via which the circumfluent zone exchanges sludge with a BDP tank.

The BDP sewage denitrogenation treatment system provided in the present application performs sludge exchange with the BDP tank through the circumfluent zone therein, and performs denitrogenation in the sewage by maximally utilizing the organics in the original water; and air is supplemented to the water body, which is capable of partially oxidizing the ammonia nitrogen in the sewage into nitrite, and allows the nitrite to oxidize the ammonia nitrogen in the sewage, thereby reducing the required quantity of the carbon source for denitrification, and finally achieving the denitrogenation treatment of the sewage. The sewage after treatment by employing the sewage denitrogenation treatment system provided in the present application is capable of meeting the upcoming discharge control standard for total nitrogen.

Figure 1:
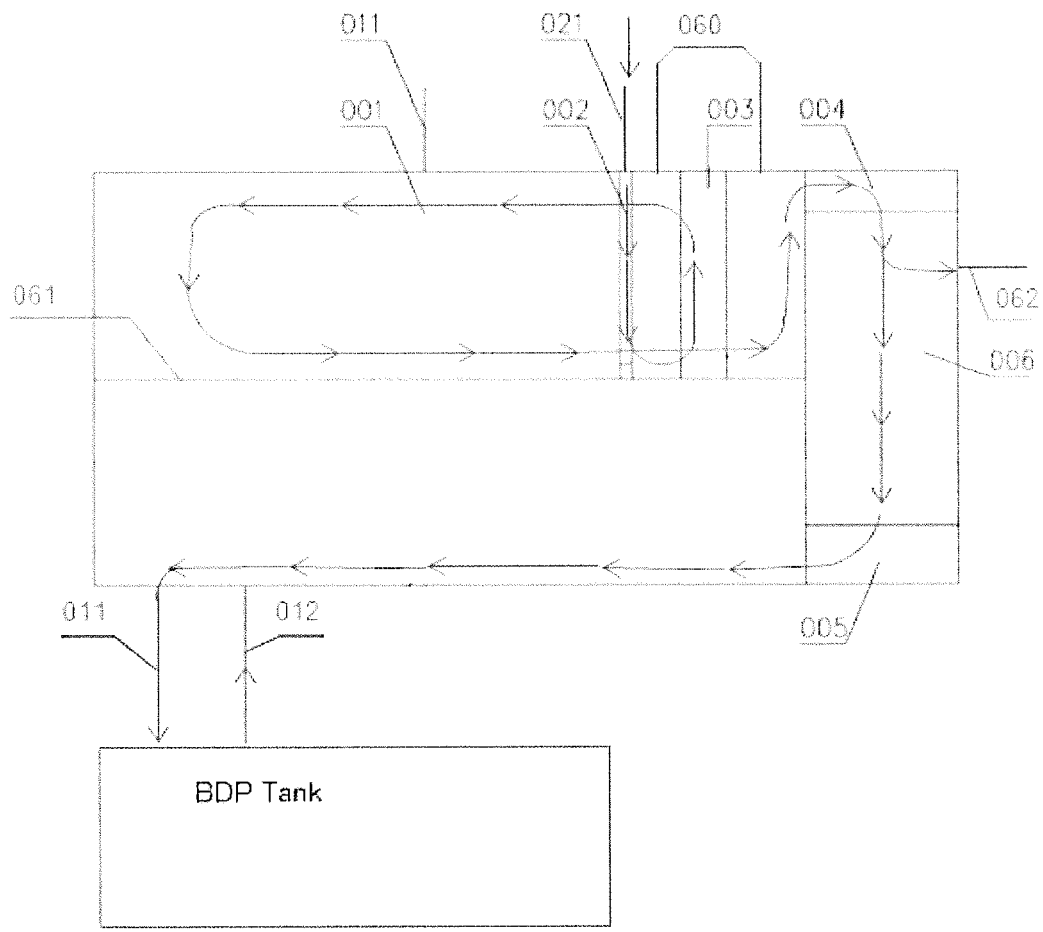
FIG. 1 is a top view of the BDP sewage treatment system provided in an example of the present invention.

FIG. 1 is a top view of the BDP sewage treatment system provided in an example of the present invention, wherein 001 is a circumfluent zone, 002 is a water inlet zone, 003 is a first aerodynamic zone, 004 is a second aerodynamic zone, 005 is a flux buffering zone, 006 is a rapid sedimentation zone, 021 is a water inlet tube of the water inlet zone, 062 is a water outlet tube of the rapid sedimentation zone, 011 is a first sludge exchange pipe, and 012 is a second sludge exchange pipe. Arrows are provided to show the direction of flow though the various elements of the system that are in fluid communication with one another.

The BDP sewage denitrogenation treatment system provided in the present invention comprises the circumfluent zone 001, within which there is provided the water inlet zone 002 and the first aerodynamic zone 003. Adjacent to first aerodynamic zone 0003 and second aerodynamic zone 004 are fluid communication zones 060.

There is no particular limitation to the shape of the circumfluent zone in the present invention, which can be an annular groove body, a square groove body, a rectangular groove body, a circular groove body or an elliptical groove body. Those skilled in the art can set the circumfluent zone in an appropriate shape as desired. In the example of the present invention, the circumfluent zone can specifically be a rectangular groove body. In order to be able to form a circulation channel, in the example of the present invention, within the circumfluent zone there is provided a division wall 061 along the longitudinal direction, the division wall is set perpendicular to the water inlet zone, the water inlet zone is set parallel to the first aerodynamic zone, and the water inlet zone and the first aerodynamic zone share walls with the division wall.

In the present invention, on the circumfluent zone there is provided a sludge exchange pipe, specifically a first sludge exchange pipe 011 and a second sludge exchange pipe 012, and the first sludge exchange pipe and the second sludge exchange pipe are the sludge inlet tube and sludge outlet tube of the circumfluent zone, respectively. In the example of the present invention, the first sludge exchange pipe and the second sludge exchange pipe are provided on the opposite side walls of the circumfluent zone, respectively. In the present invention, the sludge exchange pipe is further in communication with the BDP tank, the circumfluent zone performs sludge exchange with the BDP tank through the sludge exchange pipe, thereby performing denitrogenation by maximally utilizing the organics in the original water, so as to improve the denitrogenation effects.

There is no particular limitation to the diameter of the sludge exchange pipe and the size of the circumfluent zone in the present invention. Those skilled in the art can set the sludge exchange pipe with an appropriate diameter and the circumfluent zone with an appropriate size as desired.

Figure 2:
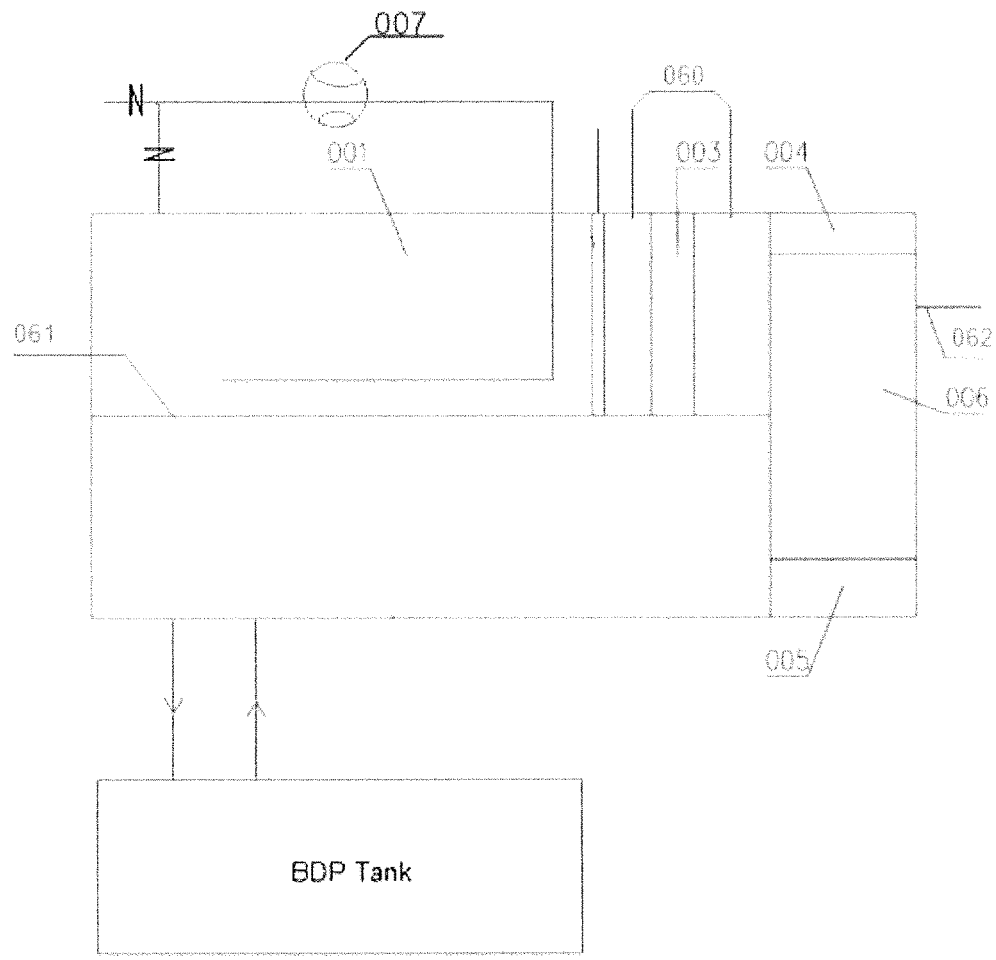
FIG. 2 is a top view of the circumfluent zone in the BDP sewage treatment system provided in an example of the present invention.

FIG. 2 is a top view of the circumfluent zone in the BDP sewage treatment system provided in an example of the present invention, wherein 007 is an air blower.

In the present invention, the circumfluent zone can also be provided with an air blower 007, which pumps the gas which can be specifically a gas with or without oxygen within the circumfluent zone to perform stirring. In the example of the present invention, at the gas inlet of the air blower there can be provided a gas distribution device, which together with the air blower can supplement air in the circumfluent zone, to facilitate the denitrogenation treatment of the sewage.

The BDP sewage denitrogenation treatment system provided in the present invention comprises a water inlet zone 002, specifically the water inlet zone can be provided within the circumfluent zone. The water inlet zone is in communication with the first aerodynamic zone. Specifically, a communication hole can be provided between the water inlet zone and the first aerodynamic zone, through which the sewage flows from the water inlet zone into the first aerodynamic zone. In the example of the present invention, the water inlet zone can be a rectangular groove body which is set perpendicular to the side wall along the longitudinal direction of the circumfluent zone, and the adjacent side walls of the water inlet zone and the circumfluent zone share one wall. In the present invention, the water inlet zone 002 is provided with a water inlet tube 021 of the water inlet zone, for the sewage to be treated to enter the sewage denitrogenation treatment system to perform denitrogenation treatment.

The BDP sewage denitrogenation treatment system provided in the present invention comprises a first aerodynamic zone 003 which is provided within the circumfluent zone, the first aerodynamic zone is in communication with the circumfluent zone. Specifically, a communication hole can be provided between the first aerodynamic zone and the circumfluent zone, through which the sewage flows from the first aerodynamic zone into the circumfluent zone. In the example of the present invention, the first aerodynamic zone and the water inlet zone are set in parallel. There is no particular limitation to the perpendicular distance between the water inlet zone and the first aerodynamic zone. Those skilled in the art can set the water inlet zone and the first aerodynamic zone as actually desired. In the present invention, the water outlet of the water inlet zone is in communication with the water inlet of the first aerodynamic zone. In the example of the present invention, within the first aerodynamic zone there is provided a first gas lifting device which is a balanced air release device. The air released by this device brings the up-flowing of a great amount of water through a narrow lifting channel. The first gas lifting device discharges air into the first aerodynamic zone, which facilitates the denitrogenation treatment of the sewage.

The BDP sewage denitrogenation treatment system provided in the present invention comprises a second aerodynamic zone 004 which has a similar function as the circumfluent zone. Specifically, a communication hole can be provided between the second aerodynamic zone and the circumfluent zone. In the example of the present invention, the second aerodynamic zone can be a rectangular groove body, and also can be a rectangular groove body. The adjacent two side walls of the second aerodynamic zone share walls with the circumfluent zone and the rapid sedimentation zone, respectively. There is no particular limitation to the size of the second aerodynamic zone. Those skilled in the art can set the second aerodynamic zone with an appropriate size as actually desired in sewage treatment. In the example of the present invention, within the second aerodynamic zone there is provided a second gas lifting device, which discharges air into the second aerodynamic zone and facilitates the denitrogenation treatment of the sewage.

The BDP sewage denitrogenation treatment system provided in the present invention comprises a rapid sedimentation zone 006, which is in communication with the second aerodynamic zone. There is no particular limitation to the size and shape of the rapid sedimentation zone. Those skilled in the art can set the rapid sedimentation zone with an appropriate size and shape as desired. In the example of the present invention, the rapid sedimentation zone can be a rectangular groove body, and can also be a square groove body. The adjacent three side walls of the rapid sedimentation zone share walls with the second aerodynamic zone, the circumfluent zone and the reflux buffering zone, respectively.

Figure 3:
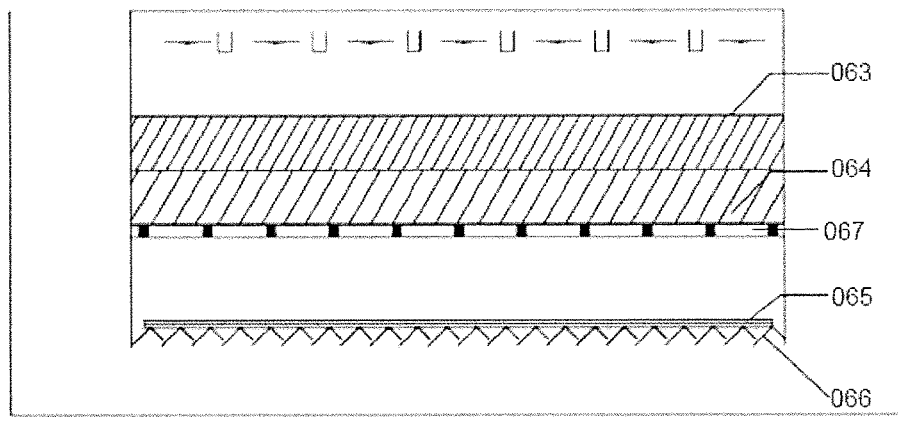
FIG. 3 is a longitudinal section view of the rapid sedimentation zone in the BDP sewage treatment system provided in an example of the present invention.

FIG. 3 is a longitudinal section view of the rapid sedimentation zone in the BDP sewage treatment system provided in the example of the present invention, wherein 063 is an inclined tube settler, 064 is an inclined plate settler, 065 is a gas flushing device, 066 is a steady flow plate, and 067 is the supporting platform of the inclined plate settler.

In the example of the present invention, at the bottom of the rapid sedimentation zone there is provided a steady flow plate, on which there is provided a gas flushing device, above which there is sequentially provided an inclined plate settler and an inclined tube settler. The inclined tube settler is disposed on the inclined plate settler, and the inclined plate settler is disposed spaced from the gas flushing device. In the present invention, the rapid sedimentation zone employs the above structure to facilitate the denitrogenation treatment of the sewage and facilitate the separation of water with the sludge, thereby obtaining the discharged water which meets the discharge requirements.

In the present invention, the rapid sedimentation zone is provided with a water outlet, which is used for discharging the treated sewage.

The BDP sewage denitrogenation system provided in the present invention comprises a reflux buffering zone in communication with the rapid sedimentation zone, and the reflux buffering zone is in communication with the circumfluent zone. Specifically, a communication hole can be provided between the reflux buffering zone and the rapid sedimentation zone, and a communication hole is provided between the reflux buffering zone and the circumfluent zone. In the example of the present invention, the reflux buffering zone can be a rectangular groove body, and can also be a square groove body. The adjacent two side walls of the reflux buffering zone share walls with the rapid sedimentation zone and the circumfluent zone, respectively.

In the example of the present invention, within the reflux buffering zone there can be provided a steady flow device and an air release device, thereby ensuring the steady flowing state in the bottom of the rapid sedimentation zone and the sufficient release of gas in the sludge-water mixture.

In order to facilitate the denitrogenation treatment of the sewage by the BDP sewage denitrogenation treatment system, in the example of the present invention, the particle size of the bacterial micelle in the sewage denitrogenation treatment system is 100 μm or less, and can also be 90 μm or less, and can also be 80 μm; the dissolved oxygen in the sewage denitrogenation treatment system discretely fluctuates within the range of 0.1 mg/L~0.3 mg/L; the lateral flow rate of the water body in the sewage denitrogenation treatment system is 0.05 m/s~0.2 m/s, and can specifically be 0.05 m/s, 0.1 m/s, 0.15 m/s or 0.2 m/s. In the present invention, the particle size of the bacterial micelle is controlled by controlling the lateral flow rate of the water body and the concentration of the dissolved oxygen.

The present invention provides a sewage denitrogenation treatment method, which comprises the following steps:

the sewage to be treated is introduced into a sewage denitrogenation treatment system via a water inlet zone;

then sequentially treated through a first aerodynamic zone, a circumfluent zone, a second aerodynamic zone and a rapid sedimentation zone, and the treated sewage is discharged via the rapid sedimentation zone;

the sludge in the rapid sedimentation zone flows back to the circumfluent zone via a reflux buffering zone;

the circumfluent zone exchanges sludge with a BDP tank via a sludge exchange pipe.

In the method provided in the present invention, the sewage to be treated is introduced into the sewage denitrogenation treatment system via the water inlet of the water inlet zone as described in the above technical solution, then sequentially flows through the first aerodynamic zone, the circumfluent zone, the second aerodynamic zone and the rapid sedimentation zone, to complete the treatment of the sewage; the treated sewage discharges via the water outlet of the rapid sedimentation zone. The rapid sedimentation zone is in communication with the flux buffering zone, and part of the treated sewage is discharged via the water outlet of the rapid sedimentation zone, and the other part flows into the reflux buffering zone via the communication hole between the rapid sedimentation zone and the reflux buffering zone, and again flows back to the circumfluent zone.

During treatment of the sewage to be treated, the present invention controls the particle size of the bacterial micelle in the sewage denitrogenation treatment system to be 100 μm or less, or 90 μm or less, or 80 μm; the dissolved oxygen in the sewage denitrogenation treatment system discretely fluctuates within the range of 0.1 mg/L~0.3 mg/L; the lateral flow rate of the water body in the sewage denitrogenation treatment system is 0.05 m/s~0.2 m/s, and it can be specifically 0.05 m/s, 0.1 m/s, 0.15 m/s or 0.2 m/s. The present invention controls the particle size of the bacterial micelle by controlling the lateral flow rate of the water body and the concentration of the dissolved oxygen. In the example of the present invention, the sludge concentration in the sewage denitrogenation treatment system can be 6 g/L~10 g/L, or 7 g/L~9 g/L. In certain examples, it can specifically be 7 g/L, 8 g/L or 9 g/L.

1701 The BDP sewage denitrogenation treatment system provided in the present invention performs sludge exchange with BDP tank via the circumfluent zone, and performs denitrogenation by maximally utilizing the organics in the original water; and air is supplemented into the water body, which is capable of partially oxidizing the ammonia nitrogen in the sewage into nitrite, which can in turn oxidize the ammonia nitrogen in the sewage, thereby reducing the required quantity of the carbon source for denitrification, and finally achieves the denitrogenation treatment of the sewage. The sewage after treatment by employing the sewage denitrogenation treatment system provided in the present application is capable of meeting the upcoming discharge control standard for total nitrogen. The results indicate that the total nitrogen content of the sewage after treatment by employing the sewage denitrogenation treatment system provided in the present invention is 5 mg/L or lower, and the highest removal rate exceeds 90%.

In order to further illustrate the present invention, one BDP sewage denitrogenation treatment system and sewage denitrogen treatment method provided in the present invention will be described in detail in conjunction with examples, but they cannot be interpreted as limiting the protection scope of the present invention.

Example 1

Municipal sewage was treated by employing the sewage treatment system with a structure as shown in FIG. 1, wherein the concentration of the dissolved oxygen is 0.2 mg/L, the concentration of sludge is 8 g/L, and the lateral flow rate of the water body is 0.1 m/s, and the results are as shown in table 1. Table 1 shows the indexes before and after the treatment of the municipal sewage in the example 1 of the present invention.

TABLE 1 the indexes before and after the treatment of the municipal sewage in the example 1 of the present invention

| Items | COD (mg/L) | $NH_3$—N (mg/L) | TN (mg/L) |
| --- | --- | --- | --- |
| Index of the inlet water | <350 | <35 | <50 |
| Index of the outlet water | <50 | <1 | <5 |

It can be seen from table 1 that the total nitrogen index of the sewage after treating the municipal sewage by employing the sewage treatment system provided in the present application meets the discharge control standard.

Example 2

Sewage from an industrial park was treated by employing the sewage treatment system with a structure as shown in FIG. 1, wherein the concentration of the dissolved oxygen is controlled at 0.2 mg/L, the concentration of sludge is controlled at 8 g/L, and the lateral flow rate of the water body is controlled at 0.2 m/s, and the results are as shown in table 2. Table 2 shows the indexes before and after the treatment of the sewage from an industrial park in the example 2 of the present invention.

TABLE 2 the indexes before and after the treatment of the sewage from an industrial park in the example 2 of the present invention

| Items | COD (mg/L) | NH$_3$—N (mg/L) | TN (mg/L) |
|---|---|---|---|
| Index of the inlet water | <350 | <50 | <100 |
| Index of the outlet water | <50 | <3 | <5 |

It can be seen from table 2 that the total nitrogen index of the sewage after treating the sewage from an industrial park by employing the sewage treatment system provided in the present application meets the discharge control standard.

Example 3

Acrylonitrile sewage was treated by employing the sewage treatment system with a structure as shown in FIG. 1, wherein the concentration of the dissolved oxygen is controlled at 0.2 mg/L, the concentration of sludge is controlled at 8 g/L, and the lateral flow rate of the water body is controlled at 0.2 m/s, and the results are as shown in table 3. Table 3 shows the indexes before and after the treatment of the acrylonitrile sewage in the example 3 of the present invention.

TABLE 3 the indexes before and after the treatment of the acrylonitrile sewage in the example 3 of the present invention

| Items | COD (mg/L) | NH$_3$—N (mg/L) | TN (mg/L) |
|---|---|---|---|
| Index of the inlet water | <1500 | <50 | <300 |
| Index of the outlet water | <120 | <1 | <15 |

It can be seen from table 3 that the total nitrogen index of the sewage after treating the acrylonitrile sewage by employing the sewage treatment system provided in the present application meets the discharge control standard.

The illustrations in the above examples are merely used to facilitate understanding the method of the present invention and the core concept thereof. It should be noted that, for an ordinary skilled in the art, improvements and modifications can also be made to the present invention without departing from the principal of the present invention, which also fall within the protection scope of the claims of the present invention. Various alterations to these examples are obvious to those skilled in the art, and the general principles defined herein can be achieved in other examples without departing from the spirit or scope of the present invention. Therefore, the present invention will not be limited to these examples as shown herein, but will conform to the broadest scope consistent with the principle and novelty characteristics disclosed herein.

The invention claimed is:

1. A Biological Double efficiency Process (BDP) sewage denitrogenation treatment system, comprising
    a water inlet zone which is provided with a water inlet;
    a first aerodynamic zone in communication with the water inlet zone;
    a circumfluent zone in communication with the first aerodynamic zone;
    a second aerodynamic zone in communication with the circumfluent zone;
    a sedimentation zone which is in communication with the second aerodynamic zone and provided with a water outlet; and
    a reflux buffering zone in communication with the sedimentation zone and the circumfluent zone; and
    on the wall of the circumfluent zone there is provided a sludge exchange pipe via which the circumfluent zone exchanges sludge with a tank.

2. The BDP sewage denitrogenation treatment system according to claim 1, characterized in that three adjacent side walls of the sedimentation zone share walls with the circumfluent zone, the reflux buffering zone and the second aerodynamic zone, respectively.

3. The BDP sewage denitrogenation treatment system according to claim 1, characterized in that the circumfluent zone is an annular groove body, a square groove body, a rectangular groove body, a circular groove body or an elliptical groove body.

4. The BDP sewage denitrogenation treatment system according to claim 1, characterized in that the bottom of the sedimentation zone is provided with a steady flow plate;
    a gas flushing device, an inclined plate settler and an inclined tube settler are provided on the steady flow plate;
    the gas flushing device is disposed spaced from the inclined plate settler; and
    the inclined tube settler is disposed on the inclined plate settler.

5. The BDP sewage denitrogenation treatment system according to claim 1, characterized in that the circumfluent zone is provided with an air blower;
    the air blower stirs the sewage within the circumfluent zone via gas-pumping.

6. The BDP sewage denitrogenation treatment system according to claim 1, characterized in that the water inlet zone and the first aerodynamic zone are provided within the circumfluent zone.

7. The BDP sewage denitrogenation treatment system according to claim 1, characterized in that within the circumfluent zone there is provided a division wall along the longitudinal direction;
    the water inlet zone and the first aerodynamic zone are provided between the division wall and the outer wall of the circumfluent zone.

8. A sewage denitrogenation treatment method, comprising the following steps:
    the sewage to be treated is introduced into a sewage denitrogenation treatment system via a water inlet zone;
    then sequentially treated through a first aerodynamic zone, a circumfluent zone, a second aerodynamic zone and a sedimentation zone, and the treated sewage is discharged via the sedimentation zone;
    the sludge in the sedimentation zone flows back to the circumfluent zone via a reflux buffering zone;
    the circumfluent zone exchanges sludge with a tank via a sludge exchange pipe.

9. The sewage denitrogenation treatment method according to claim 8, characterized in that the particle size of the bacterial micelle in the sewage denitrogenation treatment system is 100 μm or less.

10. The sewage denitrogenation treatment method according to claim 8, characterized in that the dissolved oxygen in the sewage denitrogenation treatment system discretely fluctuates within the range of 0.1 mg/L~0.3 mg/L.

11. The sewage denitrogenation treatment method according to claim 8, characterized in that the lateral flow rate of the water body in the sewage denitrogenation treatment system is 0.05 m/s~0.2 m/s.

\* \* \* \* \*